(12) United States Patent
Axelrod et al.

(10) Patent No.: US 10,932,449 B2
(45) Date of Patent: Mar. 2, 2021

(54) PET CHEW TOY PRODUCT

(71) Applicant: T.F.H. PUBLICATIONS, INC., Neptune City, NJ (US)

(72) Inventors: Glen S. Axelrod, Colts Neck, NJ (US); Ajay Gajria, Maharashtra (IN)

(73) Assignee: T.F.H. PUBLICATIONS, INC., Neptune City, NJ (US)

( * ) Notice: Subject to any disclaimer, the term of this patent is extended or adjusted under 35 U.S.C. 154(b) by 0 days.

(21) Appl. No.: 16/175,173

(22) Filed: Oct. 30, 2018

(65) Prior Publication Data

US 2019/0166800 A1    Jun. 6, 2019

Related U.S. Application Data

(62) Division of application No. 13/428,279, filed on Mar. 23, 2012, now Pat. No. 10,111,407.

(51) Int. Cl.
*A01K 15/02*    (2006.01)

(52) U.S. Cl.
CPC .................. *A01K 15/026* (2013.01)

(58) Field of Classification Search
CPC ............... A01K 15/026; A01K 15/025
USPC ......................... 119/709, 710, 711
See application file for complete search history.

(56) References Cited

U.S. PATENT DOCUMENTS

| | | |
|---|---|---|
| 5,819,690 A | 10/1998 | Brown |
| 5,947,061 A | 9/1999 | Markham et al. |
| 6,076,486 A * | 6/2000 | Oliano ............... A01K 15/026 119/709 |
| 6,098,571 A | 8/2000 | Axelrod et al. |
| 6,129,053 A | 10/2000 | Markham et al. |
| 6,427,634 B1 | 8/2002 | Mann |
| 6,634,318 B1 | 10/2003 | Rucker |
| 6,672,253 B1 * | 1/2004 | Viola .................. A01K 15/026 119/709 |
| 6,856,027 B2 | 2/2005 | Wang |
| 7,063,044 B2 | 6/2006 | Handelsman et al. |
| RE39,563 E | 4/2007 | Markham |
| 7,278,374 B2 | 10/2007 | Mann |
| 7,424,866 B1 | 9/2008 | Tsengas |
| 7,506,614 B1 | 3/2009 | Tsengas |
| 7,555,997 B2 | 7/2009 | Wolfe, Jr. et al. |
| 7,647,894 B2 | 1/2010 | Axelrod et al. |
| 7,950,352 B2 | 5/2011 | Specht |
| 8,418,657 B2 * | 4/2013 | Dixon ................. A01K 15/025 119/707 |
| 2002/0017759 A1 * | 2/2002 | McClung, III ....... A01K 15/025 273/317 |

(Continued)

FOREIGN PATENT DOCUMENTS

| | | | | |
|---|---|---|---|---|
| JP | 2010119346 A | * | 6/2010 | |
| JP | 2011224000 A | * | 11/2011 | ............. A23K 20/10 |

*Primary Examiner* — Son T Nguyen
(74) *Attorney, Agent, or Firm* — Grossman, Tucker, Perreault & Pfleger, PLLC

(57) ABSTRACT

A pet toy product comprising at least one edible treat and a body member in the form of a ring surrounding the edible treat, with the body member having opposing sides and a body member aperture. The edible treat is receivable into the body member aperture from either side of the body member, and connected to the body member within the body member aperture by a releaseable mechanical connection formed between the edible treat and the body member.

10 Claims, 6 Drawing Sheets

(56) References Cited

U.S. PATENT DOCUMENTS

| | | | |
|---|---|---|---|
| 2005/0045115 A1 | 3/2005 | Mann | |
| 2005/0115517 A1* | 6/2005 | Wolfe, Jr. | A01K 15/025 119/707 |
| 2006/0213454 A1 | 9/2006 | Wolfe, Jr. et al. | |
| 2007/0224131 A1 | 9/2007 | McCollum et al. | |
| 2010/0224138 A1 | 9/2010 | Axelrod et al. | |
| 2011/0156307 A1 | 6/2011 | Vardy et al. | |
| 2011/0185980 A1* | 8/2011 | Chefetz | A01K 29/00 119/709 |
| 2012/0204810 A1* | 8/2012 | Axelrod | A01K 15/026 119/709 |
| 2012/0240866 A1* | 9/2012 | Taylor | A01K 15/026 119/710 |
| 2012/0272922 A1* | 11/2012 | Axelrod | A01K 15/026 119/709 |
| 2013/0152871 A1* | 6/2013 | Dewey | A01K 15/026 119/710 |
| 2013/0167780 A1* | 7/2013 | Axelrod | A01K 15/025 119/710 |
| 2014/0130750 A1* | 5/2014 | Valle | A01K 15/025 119/708 |
| 2014/0224184 A1* | 8/2014 | Dewey | A01K 15/026 119/709 |

* cited by examiner

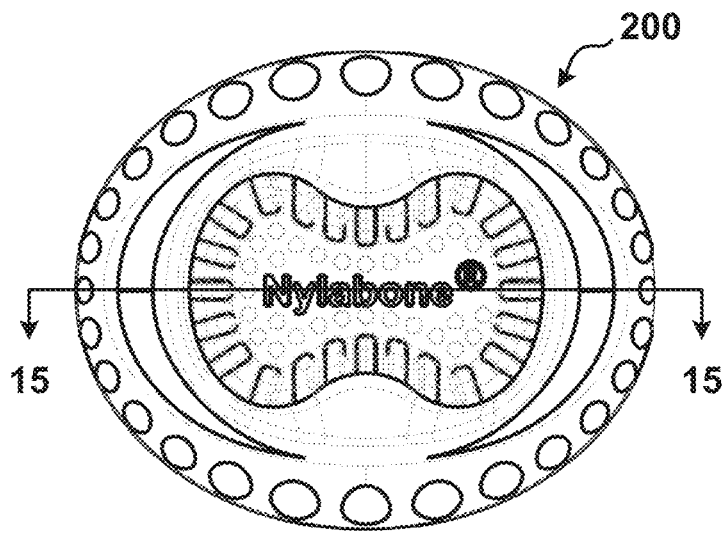
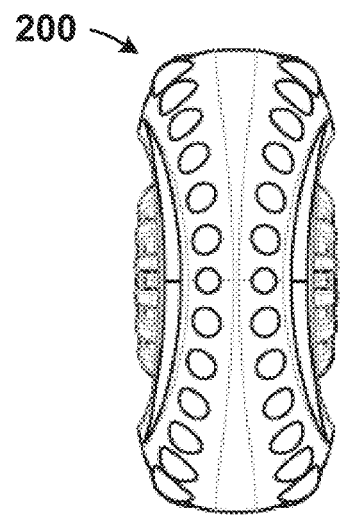
FIG. 12        FIG. 13
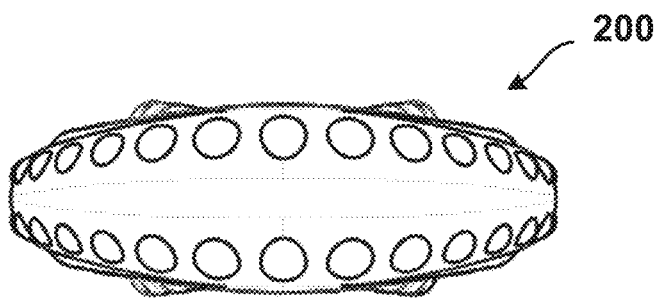
FIG. 14
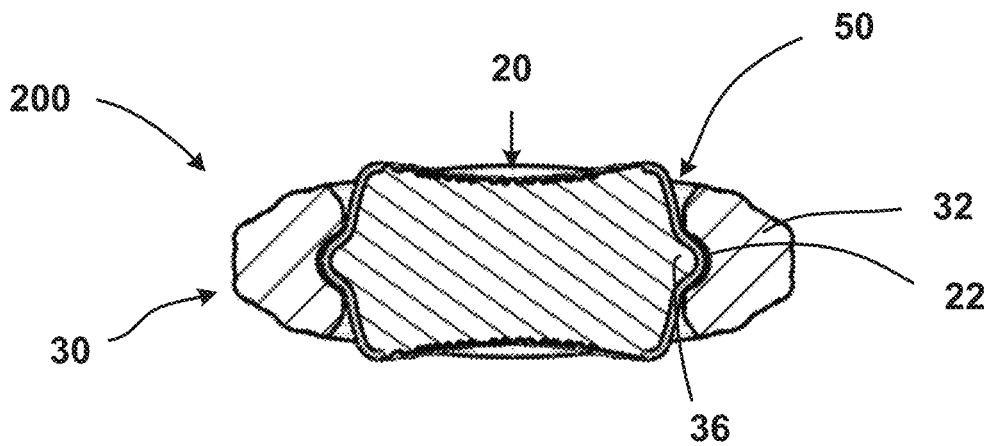
FIG. 15

PET CHEW TOY PRODUCT

FIELD

The present disclosure relates to toys for animals, particularly pets, and particularly pet toys for dogs. More particularly, the present invention relates to a pet toy product comprising an edible treat and a body member surrounding the edible treat.

BACKGROUND

Pets, and particularly dogs, are known for their penchant to bite, gnaw and otherwise chew upon objects, particularly items which may spur their natural instincts, such as natural bones. Unfortunately, dogs may also chew objects such furniture, shoes, hats and other household items causing unwanted damage thereto.

In light of the above, numerous toys have been developed to provide dogs with an enjoyable object to chew. Preferably, such toys are a distraction to which the dog, or any other pet, will direct its attention and chew upon instead of coveted items such as household décor.

While most dogs may enjoy chewing on objects, preferences appear to vary as to the hardness of the substances favored. Some dogs may like to chew on hard materials such as cow bones, wood and nylon, while other dogs may prefer softer materials such as rubber or other elastomers. Such dogs, due to their age, may not be able to chew on hard substances. Young dogs may have insufficiently developed teeth, while old dogs may have diseased gums or may have lost some of their teeth.

Attempts have been made at toys that attract pets, such as providing toys in the shape of animal bones, generally having a larger end and smaller shaft to allow the dog to more easily pick them up. Also, in this manner, a dog may hold the bone between their paws in order to chew it, thus providing a means for easy access to maintain interest.

Another purpose of pet toys has been to provide a surface upon which the pet's teeth may be scraped. Pets, such as dogs and cats, are subject to dental health problems. These problems may be traced to the formation of bacterial plaque that forms on the exterior of teeth. Tartar is the result of the thickening and hardening (mineralization) of the plaque. Dental prophylaxis is promoted in pets, and especially dogs, by the scraping of surfaces against the pet's teeth.

Another purpose of pet toys has been to provide exercise for the pets by encouraging play. Certain pets, due to a sedentary lifestyle, may gain weight or suffer from other health problems. Consequently, play is encouraged in pets to reduce the likelihood of such health issues.

Another purpose of pet toys has been to provide a holder for edible treats which may be eaten by the pet as a result of playing with the toy. Thus, such toys may provide nutrition in addition to entertaining the pet.

While the above certainly contribute to the art of providing animal toys, there is still a need for improvement. It is an object of the present invention to improve upon the art of pet toys.

SUMMARY

According to one object of the present disclosure, a toy for a pet is provided which may entertain the pet as a result of play therewith and provide exercise for the pet, as well as may encourage the pet to chew upon the toy to promote dental prophylaxis and which may provide nutrition to the pet.

According to another object of the present disclosure, a pet toy product may be provided which comprises at least one edible treat, and a body member in the form of a ring surrounding the edible treat which may provide a chew member. The body member may be intended for chewing by a pet for an extended period of time to provide entertainment, exercise and clean the pet's teeth. An edible pet treat may be distinguished from a chew in that a treat may be intended to be chewed for a relatively short time and then digested, and in doing so provide nutrition to the pet.

According to another object of the present disclosure, the body member of the pet toy product may define a body member aperture, and the edible treat may be retained within the body member aperture by a mating connection formed between the edible treat and the body member.

According to another object of the present disclosure, the mating connection formed between the edible treat and the body member may provides both a connection between the edible treat and the body member which engages to connect the edible treat and the body member, and which disengages to separate the edible treat from the body member.

According to another object of the present disclosure, the mating connection may be made to both engage and disengage by an elastic deformation of the body member.

According to another object of the present disclosure, the mating connection may be a form-locking connection. The mating connection, and more particularly, the form locking connection, is arranged to inhibit the edible treat from being separated from the body member upon the tongue being inserted in the groove.

The form-locking connection may be provided by a tongue inserted in a groove. The tongue may be located on the body member. The tongue may project inwardly on the body member to narrow an intermediate portion of the body member aperture in relation to adjacent portions of the body member aperture located on opposing sides thereof. The tongue may be continuous around the body member aperture to narrow the body member aperture, and may have a semi-circular cross-sectional shape.

According to another object of the present disclosure, the groove may be located on the edible treat. The groove may be continuous around the edible treat, and semi-circular in cross-sectional shape.

According to another object of the present disclosure, the body member may provide a continuous band of pliable polymer material around a periphery of the edible treat. The pliable polymer material may comprise a synthetic thermoplastic and/or a thermoset elastomer.

According to another object of the present disclosure, the edible treat may have a length dimension, a width dimension and a thickness dimension; and the body member may overlie the treat thickness dimension along the treat length dimension and the treat width dimension.

According to another object of the present disclosure, the edible treat may be oblong, and may have a barbell shape. The edible treat may have opposing end sections which narrow in at least one of the width dimension and the thickness dimension in a direction towards an intermediate section of the edible treat. The edible treat and body member together may form a disc shape.

According to another object of the present disclosure, a pet toy product may be provided comprising a body member having a first cavity portion and a second cavity portion on opposing sides thereof, the first cavity portion and the second cavity portion having a common shape; a plurality of edible treats comprising a first treat and a second treat, the first treat and the second treat having a common shape and each exposed on the opposing sides of the body member; the first edible treat connected to the body member by a mating connection formed between the first edible treat and the body member in the first cavity portion; the second edible treat connected to the body member by a mating connection formed between the second edible treat and the body member in the second cavity portion; and the first cavity portion and the second cavity portion separated by a shared wall which defines a bottom of the first cavity portion and defines a bottom of the second cavity portion.

According to another object of the present disclosure, a pet toy product may be provided comprising an edible treat releasably connected to a body member by a releaseable mechanical connection formed between the edible treat and the body member; wherein the releaseable mechanical connection is provided by a tongue located on the body member inserted in a groove located on the edible treat.

BRIEF DESCRIPTION OF THE DRAWINGS

The above-mentioned and other features of this disclosure, and the manner of attaining them, will become more apparent and better understood by reference to the following description of embodiments described herein taken in conjunction with the accompanying drawings, wherein:

FIG. 12 is a top view of the assembled pet toy product of FIG. 11;

FIG. 13 is a right side view of the assembled pet toy product of FIG. 11;

FIG. 14 is a longitudinal side view of the assembled pet toy product of FIG. 11; and FIG. 15 is a cross-sectional view of the assembled pet toy product of FIG. 10 taken along line 15-15 of FIG. 12.

DETAILED DESCRIPTION

Figure 1:
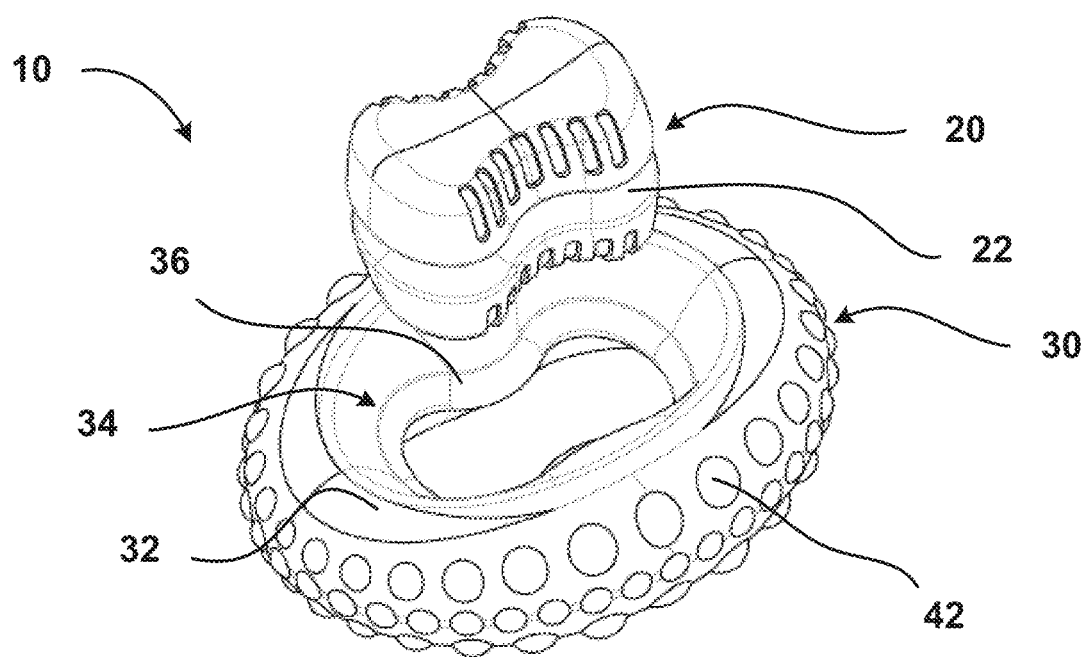
FIG. 1 is an exploded perspective view of a pet toy product according to one embodiment of the present disclosure.
Figure 2:
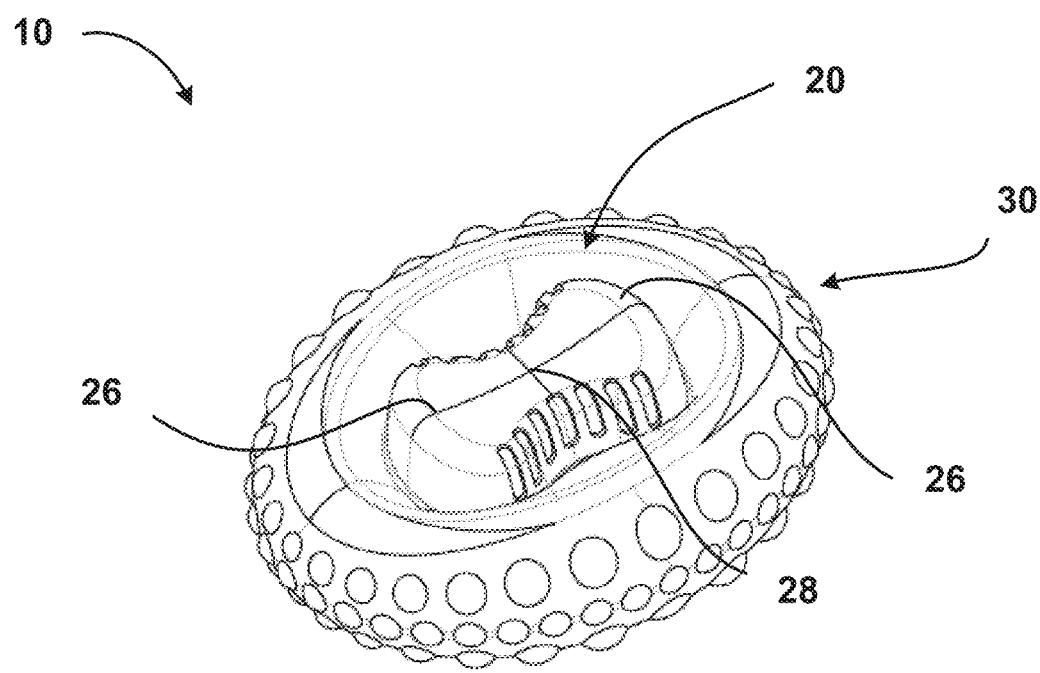
FIG. 2 is an assembled perspective view of the pet toy product of FIG. 1.

It may be appreciated that the present disclosure is not limited in its application to the details of construction and the arrangement of components set forth in the following description or illustrated in the drawings. The embodiments herein may be capable of other embodiments and of being practiced or of being carried out in various ways. Also, it may be appreciated that the phraseology and terminology used herein is for the purpose of description and should not be regarded as limiting.

Referring to FIGS. 1-6, there is shown a pet toy product, such as for a dog or other pet, at reference character 10. As shown, pet toy product 10 may comprise an edible treat 20 and a body member 30, particularly formed of a polymer material, in the form of a ring 32 surrounding the edible treat 20 such as an oblong ring. With the oblong shape, the pet toy product 10 is inhibited from rolling away from an animal when the animal is utilizing the pet toy product 10.

More particularly, the body member 30 comprises a continuous, unitary (one-piece), closed ring or band of pliable polymer material, in a general shape of a tire or donut, around a periphery of the edible treat 20. Body member 30 may include a plurality of circular raised portions 42 to promote dental hygiene. The edible treat 20 and the body member 30 may be formed by molding processes such as injection molding.

By the term "pliable," it is meant that the material is flexible at room temperature and will elastically deform and/or deflect under stress/strain encountered when used as a body member in the present application, as well as elastically recovery when such stress/strain is removed. In terms of mechanical properties, the pliable polymer material may particularly have a hardness on the Shore A scale in the range of and including all increments between 40 A to 90 A, and/or a percent elongation at break of over 200%, and/or a tensile strength in the range of 1,000-7,500 psi.

The pliable polymer material may comprise, essentially consist of, or consist of a natural and/or synthetic thermoplastic elastomer, and/or a thermoset elastomer. More particularly, the pliable polymer material may comprise, essentially consist of, or consist of a thermoplastic olefin elastomer, polyurethane elastomer, or vulcanized rubber.

Rubber may include, but not be limited to, natural rubber, such as cis- and/or trans-1.4-polyisoprene, and synthetic rubber, including, but not limited to, silicone rubber (—Si—O—).sub.n, methyl vinyl silicone, styrene-butadiene copolymers, acrylonitrile butadiene, isobutylene isoprene butyl, ethylene propylene, bromo isobutylene isoprene, chloro isobutylene isoprene, polychloroprene, chlorosulfonated polyethylene, epichlorohydrin, ethylene propylene diene monomer, fluorinated hydrocarbon, fluoro silicone and hydrogenated nitrile butadiene.

As best shown in FIG. 1, ring 32 defines a ring aperture 34. As shown in FIGS. 2-6, and more particularly FIG. 6, the edible treat 20 may be retained within the ring aperture 34 by a mating connection 50 formed between the edible treat 20 and the body member 30.

The mating connection 50 formed between the edible treat 20 and the body member 30 may provide both a connection between the edible treat 20 and the body member 30 which engages to connect the edible treat 20 and the body member 30 and which disengages to separate the edible treat 20 from the body member 30. The mating connection 50 may be made to both engage and disengage by an elastic deformation of the body member 30.

More particularly, as shown, the mating connection 50 is a form locking connection. As used herein, a "form locking connection" may be understood to include connections which connect two elements together due to the shape of the elements themselves, as opposed to a force-locking connection, which locks the elements together by force external to the elements, such a connection provided by an adhesive or separate fastener. The mating connection 50, and more particularly, the form locking connection, may be particularly arranged to inhibit the edible treat 20 from being separated from the body member 30 upon a tongue 36 being inserted in a groove 22.

As shown for the present embodiment, the tongue 36 may be located on the body member 30. As shown, the tongue 36 may project inwardly on the body member 20 to narrow an intermediate portion of the ring aperture 34 in relation to adjacent shoulder portions 38, 40 of the body member 30 and ring aperture 34 located on opposing sides thereof. Shoulder portions 38, 40 may taper inward to function as a lead in for assembly of edible treat 20 and body member 30. In certain embodiment, shoulder portions 38, 40 do not make contact with opposing shoulder portions 39, 41 of edible treat 20 adjacent groove 22. In this manner, only the interference of tongue 36 and groove 22 may hold edible treat 20 and body member 30 in an assembled state relative to one another. Such may provide adequate resistance to separation of edible treat 20 and boy member 30 when pet toy product 10 is utilized by an animal, but not an extreme amount of resistance which may frustrate the animal. Also as shown, the tongue 36 may be continuous around the ring aperture 34 to narrow the ring aperture 34, and may have a semi-circular cross-sectional shape.

As shown for the present embodiment, the groove 22 may be located on the edible treat 20. Depending on the nature of the edible treat 20, it may be advantageous to have the groove located on the edible treat 20 as opposed to the tongue 36, particularly if the tongue 36 when located on the edible treat 20 may be broken off the edible treat 20 during processing or handling as a result of its outward extending geometry.

Figure 3:
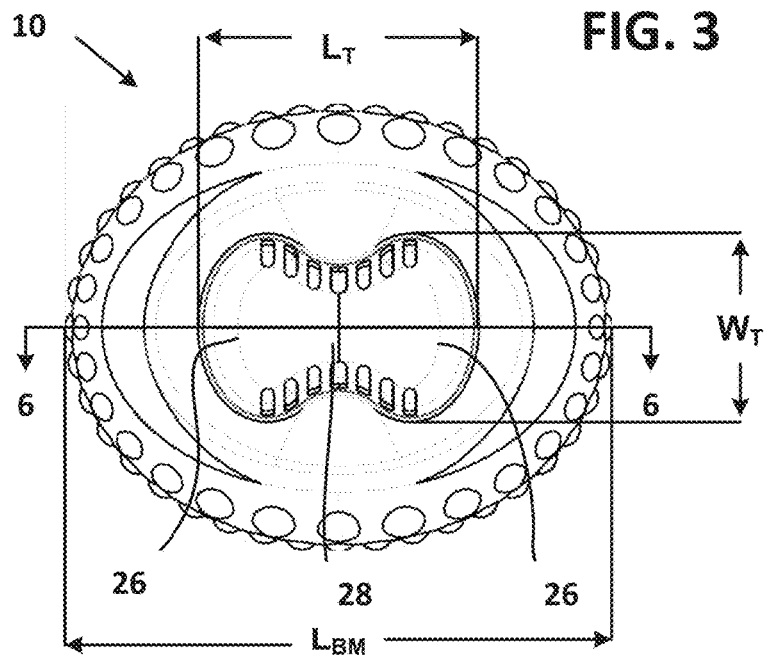
FIG. 3 is a top (front side) view of the assembled pet toy product of FIG. 2.
Figure 4:
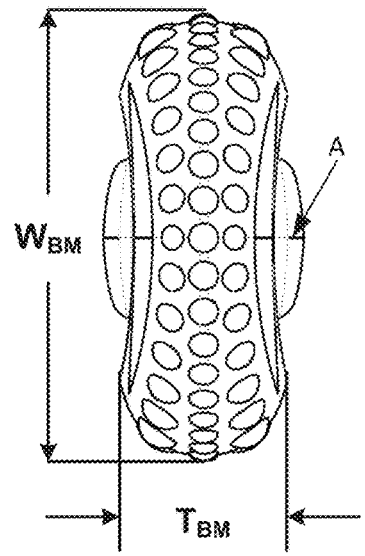
FIG. 4 is a right side view of the assembled pet toy product of FIG. 2.
Figure 5:
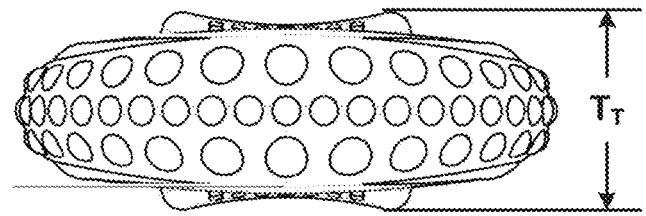
FIG. 5 is a longitudinal side view of the assembled pet toy product of FIG. 2.
Figure 6:
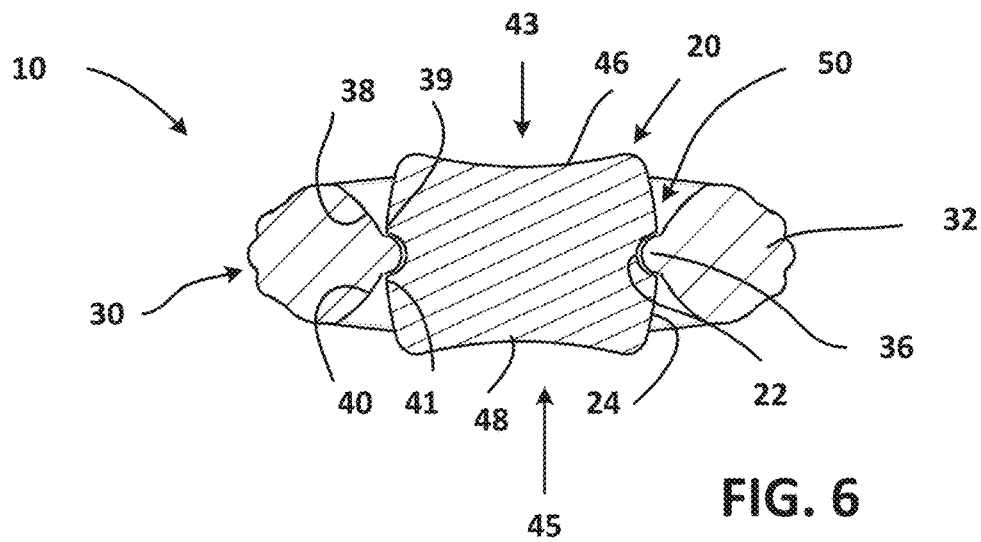
FIG. 6 is a cross-sectional view of the assembled pet toy product of FIG. 2 taken along line 6-6 of FIG. 3.

Also as shown, the groove 22 may be continuous around the edible treat 20 and have a semi-circular cross-sectional shape to correspond to the tongue 36. As shown in FIGS. 3-5, the edible treat 30 is oblong, and has a length dimension $L_T$, a width dimension $W_T$ and a thickness dimension $T_T$, with the length dimension $L_T$ being greater than the width dimension $W_T$. As shown, the edible treat 20 has an hour-glass or barbell shape (i.e. a smaller central/intermediate portion between to larger adjoining end portions. Furthermore, as shown, the edible treat 30 has opposing end sections 26 which narrow in at least one of the width dimension $W_T$ and the thickness dimension $T_T$ in a direction towards an intermediate section 28 of the edible treat.

Similarly, as shown in FIGS. 3-5, the body member 30 is oblong, and has a length dimension $L_{BM}$, a width dimension $W_{BM}$ and a thickness dimension $T_{BM}$, with the length dimension $L_{BM}$ being greater than the width dimension $W_{BM}$, and the width dimension $W_{BM}$ greater than the thickness dimension $T_{BM}$. The body member 30 overlies the treat thickness dimension $T_T$ along the treat length dimension $T_L$ and the treat width dimension $T_W$.

In the foregoing manner, edible treat 20 may be assembled with body member 30 by first inserting one end section 26 into ring aperture 34 such that tongue 36 is inserted in groove 22. Thereafter, in order to fully assemble, suitable force may be applied to the remaining (uninserted) section 26 of edible treat 20 transverse to appropriate surface 46 or 48 (here surface 46) such that groove 22 moves towards tongue 36 and such that tongue 36 may elastically deform outwards due to contact with side surface 24 until entering groove 22, at which time tongue 36 and the remainder of body member 30 may elastically recover with the tongue 36 inserted in groove 22 completely around edible treat 20.

Edible treat 20 may be dissembled from body member 30 also by applying suitable force transverse to appropriate surface 46 or 48 (here surface 48) such that groove 22 moves away from tongue 36 and such that tongue 36 may elastically deform outwards due to contact with side surface 24 until side surface 24 begins to separate from tongue 36, at which time tongue 36 may elastically recover with the tongue 36 separated from groove 22.

As shown, both edible treat 20 and body member 30 may be bilaterally symmetrical relative to their mid-length, mid-width and mid-thickness, thus having three axes of symmetry to simply manufacturing, as well as assembly and/or disassembly. For example, either side 46, 48 of edible treat 20 may be used for assembly to and/or disassembly from body member 30, as well as edible treat 20 being assembled and/or disassembled with body member 30 from either side 43, 45 thereof.

As shown, the edible treat 20 and body member 30 together form a disc shape. Among other benefits, the oblong shape makes removal of the treat 20 from the body member 30 more difficult for the pet, as well as protects the treat 20 from breakage and falling out of the body member 30 when the pet toy product 10 may be thrown by a person playing fetch with the pet.

Due to the arrangement of edible treat 20 and body member 30, in attempting to obtain the edible treat 20, the pet or animal may apply pressure with their upper and lower jaws to opposing longitudinal sides 46 and 48 on opposite longitudinal sides of the pet toy product 10 in an attempt to break off pieces of the edible treat 20 by crushing the edible treat 20 particularly with its canine (cuspid) teeth. In doing so, it may be expected that a portion of the body member 30 would be inserted into the pet's mouth beyond the canine teeth and into contact with the molars, which may then be provided with dental hygiene/prophylaxis by the rubbing of surfaces of the body member 30 against the pet's teeth. Particularly for smaller pets which may not be able to grasp the pet toy product 10 in their mouth, the pet may choose to apply pressure to just one side 42 or 44 of edible treat 20 and bite or gnaw such.

The edible treat 20 may include an edible resin which may be consumed by a pet or other animal, such as, for instance, one or more of a starch, gluten, vegetable based protein, a carbohydrate or fat and mixtures thereof. Accordingly, an edible resin may contain a mixture of, e.g., starch, gluten, carbohydrate and/or a fat. For example, an edible resin may contain 25% (wt) starch, 25% (wt) gluten, 25% (wt) carbohydrate and 25% (wt) fat. However, any and all values of such components may be employed, wherein the components may be present in any value or range at about 1-99% (wt). Accordingly, such an edible resin may contain 50% (wt) gluten, 25% (wt) starch, 15% (wt) carbohydrate and 10% (wt) fat. It may also contain 75% (wt) gluten, with the remaining 25% (wt) distributed over the other identified edible sources. Those skilled in the art will therefore appreciate other potential values and ranges. Accordingly, any one of the ingredients (starch, gluten, vegetable based protein, fat) may be present as a major ingredient (50% (wt) or greater) and the other components may be present at less than 50% (wt).

As alluded to above, such an edible resin may include any starch or carbohydrate of natural or vegetable origin or gluten, such as wheat gluten. Exemplary starches may include amylose and/or amylopectin and may be extracted from plants, including but not limited to potatoes, rice, tapioca, corn and cereals such as rye, wheat, and oats. The starch may also be extracted from fruits, nuts and rhizomes, or arrowroot, guar gum, locust bean, arracacha, buckwheat, banana, barley, cassaya, konjac, kudzu, oca, sago, sorghum, sweet potato, taro, yams, fava beans, lentils and peas. The starch may be present in the resin composition between about 30-99% including all increments and values therebetween such as levels above about 50%, 85%, etc.

The starch employed herein may be raw starch, which may be understood as starch that has not seen a prior thermal molding history, such as extrusion or other type of melt processing step where the resin is shaped in the presence of heat. The raw starch itself may also be native, which may be understood as unmodified starch recovered in the original form by extraction and not physically or chemically modified. The raw starch may also be in powder form of varying particle size, as described above, which may be understood as milled and/or pre-sifted. It should be understood that the raw starch may also have varying degrees of moisture present. In one embodiment, moisture may be present in the raw starch between 1-60%, including all increments and values therebetween such as 40%, 20%, 10%, etc. Accordingly, it should be appreciated that the term "direct" as used herein with respect to molding refers to the molding of resin (e.g. starch) without the resin having been exposed to prior thermal molding histories before injection molding (such as the formation of pellets). However, the resin (e.g. starch) herein may, e.g., be heated for drying purposes, which would not amount to a prior thermal molding history.

Gluten may be understood as water-insoluble protein complex extracted from cereal grains such as maize or corn and wheat. Accordingly, the present disclosure contemplates the use of a wheat gluten material either as the base resin or in combination with another edible resin, such as starch. The gluten may be composed of gliadin and glutenin. Again, as noted above, gluten may be present in the resin composition between about 1-99% including all increments and values therebetween, such as at levels above 50%.

The edible resin composition herein may be sourced from Manildra Group USA, under the following trade names: "GEMSTAR 100," which is a refined food grade wheat starch; "GEMSTAR100+," which is a refined food grade wheat starch; "GEM OF THE WEST VITAL WHEAT GLUTEN," which is a powder product produced by low temperature drying of gluten extracted from wheat flour; "ORGANIC GEM OF THE WEST VITAL WHEAT GLUTEN," which is a powder product produced by low temperature drying of gluten extracted from organic wheat flour; "ORGANIC GEMSTAR 100," which is a wheat starch extracted from organic wheat flour; and/or "ORGANIC GEMGEL 100," which is a pre-gelatinized organic wheat starch. In addition, the resin composition may be sourced from ADM under the trade names "EDIGEL 100," which is a wheat resin composition, and "AYTEX P," which is an unmodified food grade wheat starch.

The edible resin (e.g. starch or gluten) may be of a controlled particle size, and may have a controlled level of moisture, so that the resin may be formed, upon exposure to one cycle of heat, into a desired shape. The resin may have a particle size distribution wherein all or a portion of the particles are less than about 2.0 millimeters (mm), or 2000 microns, including all ranges of particle size that may be below 2000 microns. For example, the resin particle size may be less than about 500 microns and any value or range between 500 microns and 1 micron, including less than 250 microns, less than 149 microns, less than 44 microns, etc. In one embodiment, approximately greater than 95% of the particles are less than 149 microns and approximately greater than 60% of the particles are less than 44 microns. In another embodiment, approximately greater than 97% of the particles are less than 250 microns, and approximately greater than 75% of the particles are less than 149 microns. The resin may also have a bulk density of between 30-50 lb/cubic foot, including all values and ranges therebetween such as between 40-45 lb/cubic foot, 38-40 lb/cubic foot, 35-38 lb/cubic foot, etc.

The resin may also include or be based upon cellulose. The cellulose may be, for example, a long-chain polymer of polysaccharide carbohydrate. The cellulose may also be derived or extracted from plants. The cellulose may be incorporated into the resin composition between about 1-15% by weight of the resin composition and any increment or value therebetween including 4%, 10%, 11%, etc.

Emulsifiers or surfactants may also be incorporated into the resin composition. The emulsifier may be present between about 1-10% by weight of the resin composition and all increments or values therebetween including 3%, 4%, etc. The emulsifier may include, for example, lecithin, which may be extracted or derived from egg yolk or soy beans.

The resin composition may also include a plasticizer. The plasticizer may include for example, glycerin. The plasticizer may be incorporated between about 15-30% by weight, including all increments and values therebetween such as levels greater than 15%, 21%, 27% etc.

A humectant may also be incorporated into the resin composition. The humectant may include, for example, oat fiber. The humectant may be incorporated between about 0.1-5% by weight of the resin composition including all intervals and values therebetween, including 1%, 25%, etc. A humectant may be understood to be any additive that may absorb water in the material.

The resin composition may also include water. The water may be introduced into the composition between about 1-40% by weight of the resin composition and any increment or value therebetween, including 4%, 20-40%, 10-20%, etc. After the strip has been formed, the water may be present between 1-20% by weight of the resin composition including all increments or values therebetween, such as, below 20%, 4%, 5-10%, etc.

The resin composition may include a nutraceutical. The nutraceutical may be fermented soya. Fermented soya nutraceuticals are available from Bio Food, Ltd., Pine Brook, N.J. and sold under the general trademark Soynatto®. The fermented soya may be present between about 1-40% by weight of the resin composition, including all increments and values therebetween, including 10%, 20%, etc. The Soynatto® product may provide proteins, minerals, and vitamins, in a fermented soy form. The fermentation process may infuse the product with *Saccharomyces cerevisiae*, commonly known as "bakers yeast" or "brewers yeast." *Saccharomyces cerevisiae* is more traditionally known to ferment sugars present in flour or dough, yielding carbon dioxide and alcohol. Accordingly, it should be appreciated that a protein, one or more of a mineral, and one or more of a vitamin, along with *Saccharomyces cerevisiae* may be present in the resin composition.

The fermented soy product herein may also include increased concentrations of glycitein, daidzein and genistein, reportedly present at several hundred percent more than other more common soyfood sources. Glycitein, daidzein and genistein belong to the isoflavone class of flavanoids and may be classified as phytoestrogen, since they are plant derived nonsteriodal compounds that contain estrogen-like biological activity.

The resin composition may also include enzymes and/or co-enzymes which are similarly available through Bio Foods, Ltd., Pine Brook, N.J. and sold under the trademark of BT-CoQ10®. This reportedly is a biologically transformed (fermented) cell mitochondrial coenzyme and contains Coenzyme Q10, antioxidants, phytonutrients and cofactor mineral nutrients and other cell constituents. The enzymes and/or co-enzymes may be present between 0.1-10% by weight of the resin composition, including all increments and values therebetween such as 1%, 5%, etc.

Reportedly, the coenzyme Q10 is a fat-soluble compound primarily synthesized by the body and also consumed in the diet and is required for mitochondrial ATP synthesis. The fermented coenzyme also reportedly belongs to the family of compounds known as ubiquinones, which are either of two isomeric cyclic crystalline compounds $C_6H_4O_2$ that are di-keto derivatives of dihydro-benzene. It may also function as an antioxidant in cell membranes and lipoproteins.

Other additives may be introduced into the resin composition as well. These additives may include vegetable matter, fruit matter, rawhide, nuts, nut bits or nut flour such as peanut flour, and animal or fish products, by-products, meal or digests, etc. By animal digest it is understood to include a substance made by taking relatively clean and relatively undecomposed animal tissue and breaking it down utilizing chemical or enzymatic hydrolysis. Preferably, the animal digest is hydrolyzed liver, e.g., hydrolyzed poultry liver. The animal digests may be obtained from Applied Food Biotechnology Incorporated, O'Fallon, Mo., and sold under the trade name Optimizor®. These additives may be present individually or cumulatively between about 0.1-50% by weight of the resin composition and all increments and values therebetween including 0.1-5.0%, 15%, 25%, etc.

Additionally, flavorants, herbs, herbal extracts, vitamins, minerals, colorants, yeast products, soy products, attractants, etc., may be incorporated into the resin composition. Yeast products may include nutritional yeast or brewers yeast such as *Saccharomyces cerevisiae*, dairy yeast such as *Kluyveromyce marxianus* or wine yeast such as *Saccharomyces fermentati*. The soy products may include fermented soy or other soy products, such as miso paste or tempeh. Attractants may include compounds listed herein, such as the animal or fish digests, or other compounds that may increase an animal's interest in the resin composition. These additives may be present individually or cumulatively between about 0.01-25% by weight of the resin composition and any increment or value therebetween including 0.01-0.5%, 10%, 20%, etc. The composition may also include calcium carbonate. The calcium carbonate may be present between about 5-10%.

The edible resin may be compounded by melt mixing or blending. Once compounded, the resin may be formed into a desired shape. It should be appreciated that the compounding and forming processes may occur in separate steps or at the same time. For example, the ingredients may be fed into an injection molding machine or into an extruder, mixed and plasticated through rotation of a screw and formed upon injection into a cavity or passage through an extruder die. In another embodiment, the ingredient may be fed into a twin screw extruder or a blender, compounded and formed through a die into the desired shape. In a further embodiment, the ingredients may be compounded in a blender or mixer and then the compounded resin may be fed into a molding machine, wherein it is plasticated.

In addition, moisture, including water, may be removed from the resin composition during processing. For example, a vented barrel may be provided in an extruder or injection molding machine. The moisture content may also be reduced by introducing the strip or sheet into an oven, dryer, cooling tunnel, etc. However, it should be appreciated that it may be desirable that the resin contain sufficient moisture to allow the resin to be formed into and with the rawhide and then once formed both the resin and rawhide may be dried.

Figure 7:
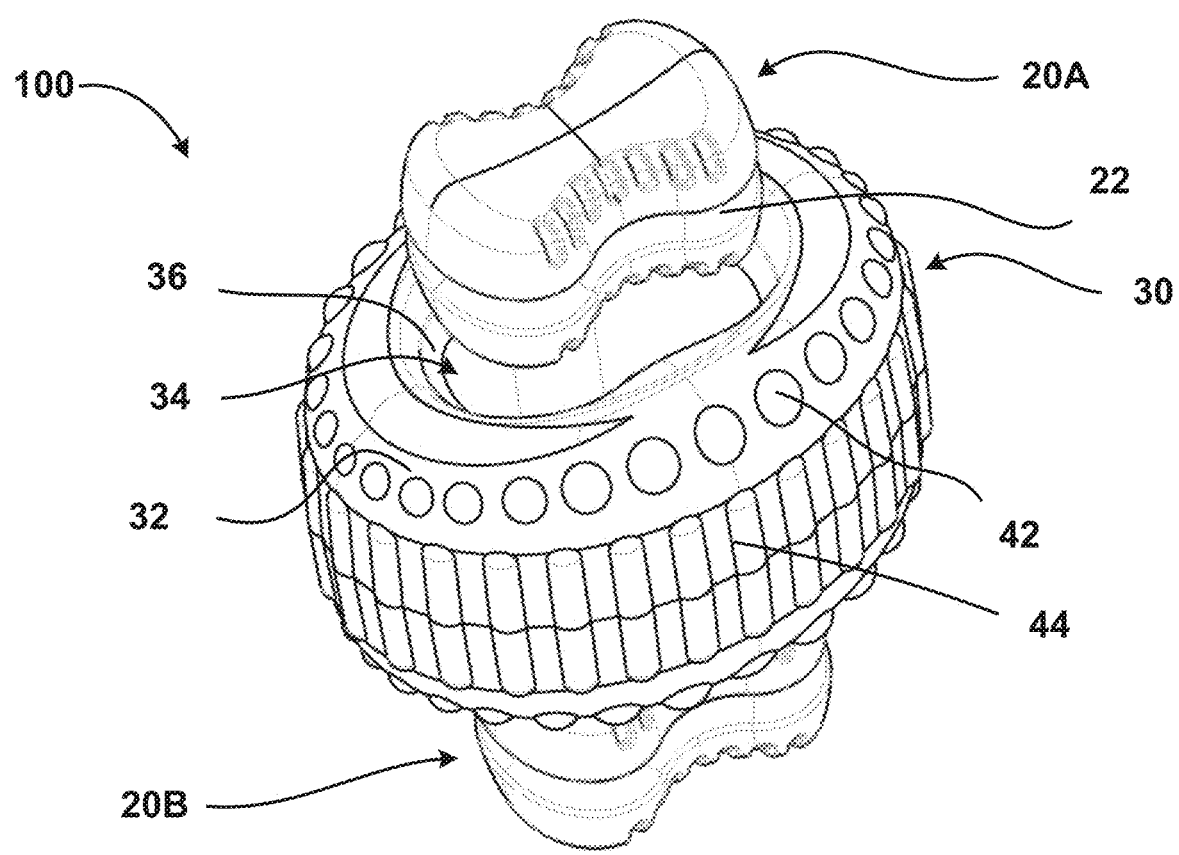
FIG. 7 is an exploded perspective view of a pet toy product according to another embodiment of the present disclosure.
Figure 8:
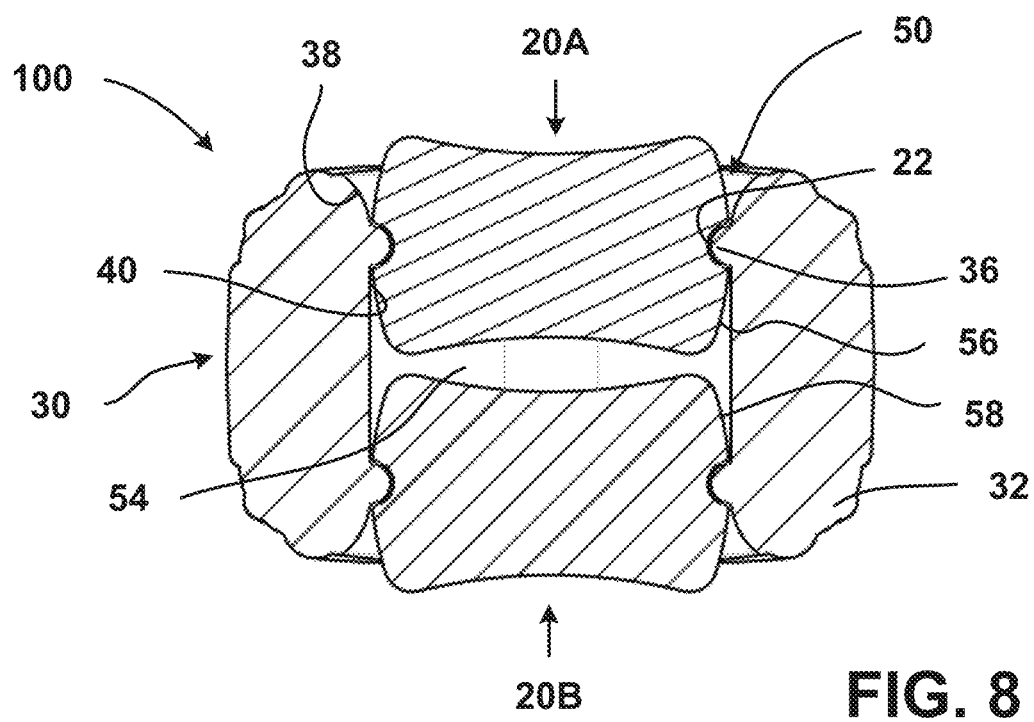
FIG. 8 is a cross-sectional view of the assembled pet toy product of FIG. 7 taken in the longitudinal direction.

Referring to FIGS. 7-8, there is shown another embodiment of pet toy product at reference character 100. In contrast to the first embodiment, pet toy product 100 includes a plurality of edible treats 20A and 20B, and body member includes a plurality of elongated raised ridges 44.

As shown, body member 30 has a cavity 54 with a first cavity portion 56 and a second cavity portion 58 on opposing sides of the body member 30, with the first cavity portion 56 and the second cavity portion 58 having a common shape. A first treat 20A and a second treat 20B, particularly having a common shape, are each exposed on the opposing sides of the body member 30. First edible treat 20A is connected to the body member 30 by a mating connection, similar to prior embodiments, formed between the first edible treat 20A and the body member 30 in the first cavity portion 56. Similarly, the second edible treat 20B is connected to the body member 30 by a mating connection, similar to prior embodiments, formed between the second edible treat 20B and the body member 30 in the second cavity portion 58.

Figure 9:
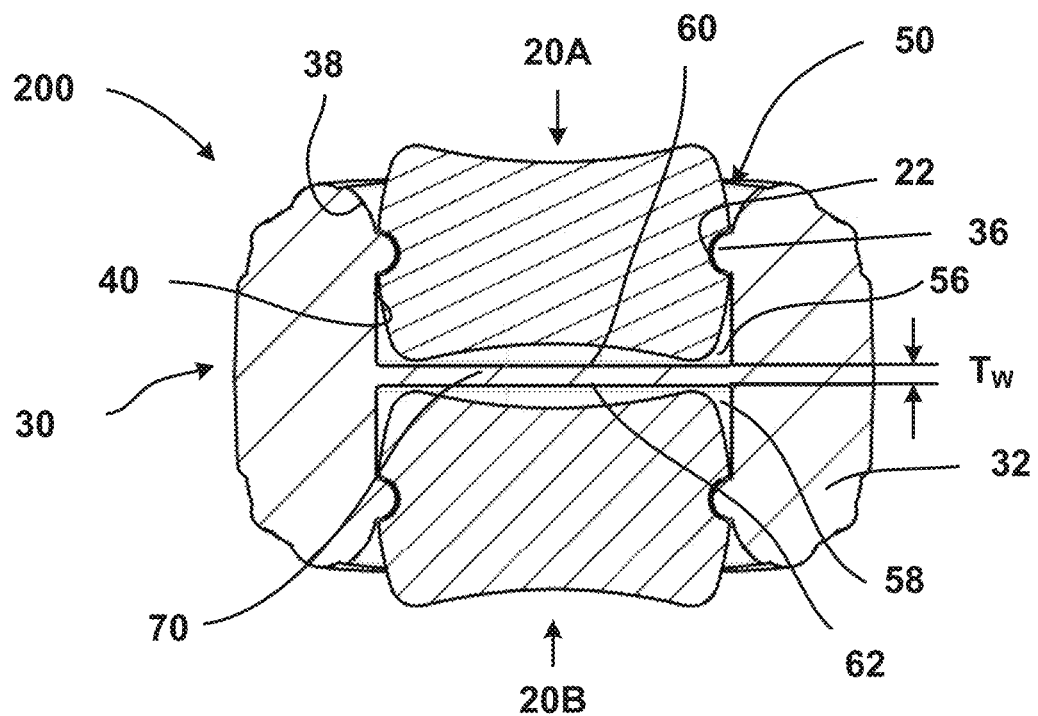
FIG. 9 is a cross-sectional view of another assembled pet toy product of FIG. 7 taken in the longitudinal direction.
Figure 10:
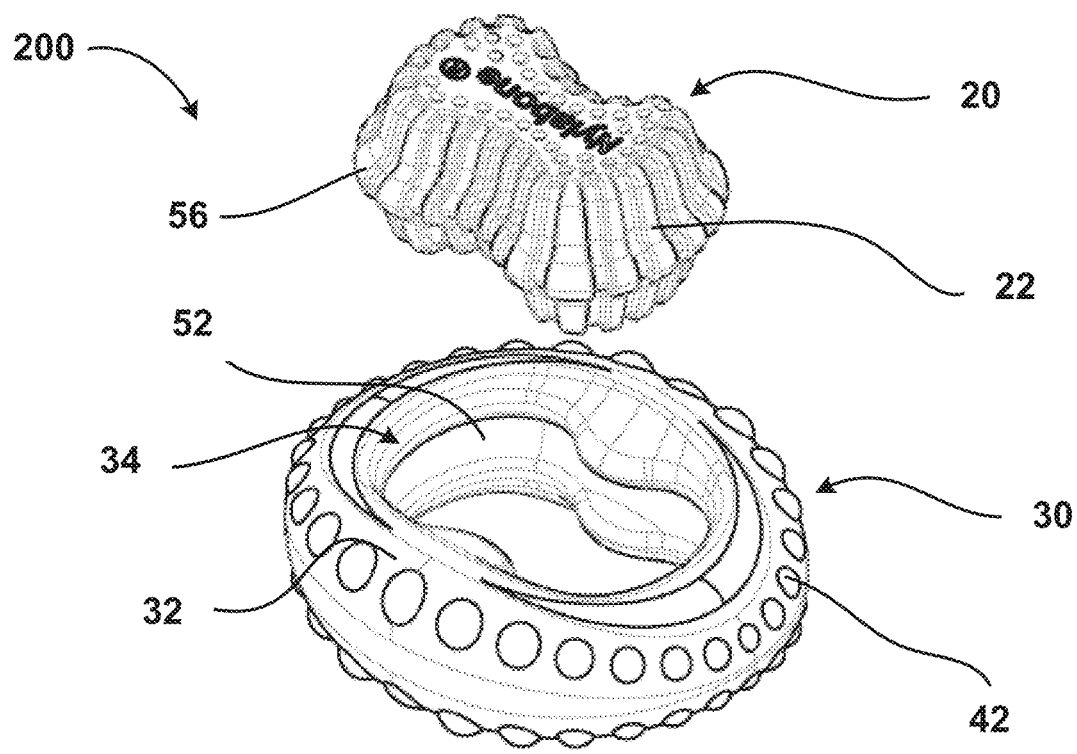
FIG. 10 is an exploded perspective view of a pet toy product according to another embodiment of the present disclosure.
Figure 11:
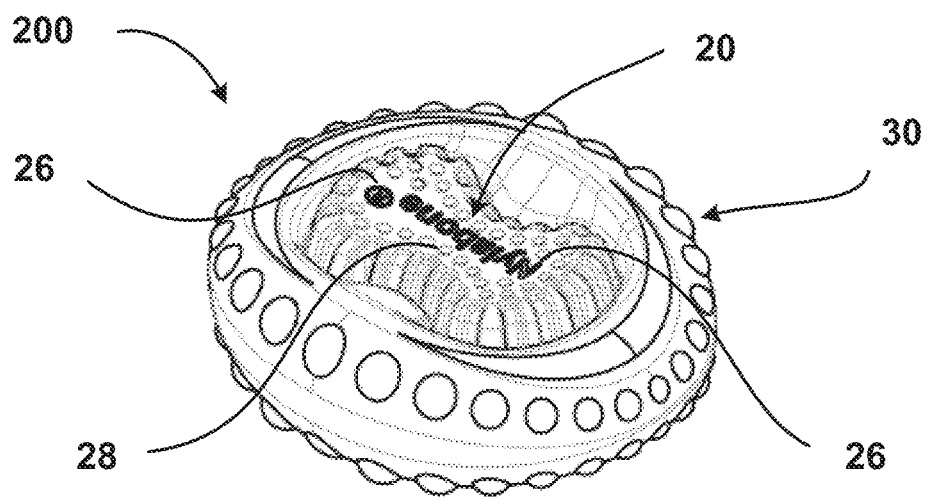
FIG. 11 is an assembled perspective view of the pet toy product of FIG. 10.

Referring to FIG. 9, there is shown another embodiment of pet toy product at reference character 200. In contrast to the previous embodiment, pet toy product 200 includes a central dividing wall 70 having a thickness $T_W$ between edible treats 30 located on opposite sides of pet toy product 200. Thus, in this embodiment first cavity portion 54 and the second cavity portion 56, particularly being common (i.e. having substantially similar or equal size and shape, within the realm of manufacturing tolerances) may be separated at least partially, and in some embodiments completely by a shared wall 70 which defines a bottom 60 of the first cavity portion 54 and defines a bottom 62 of the second cavity portion 56.

In order to better ensure a proper mating connection between the edible treats 20A/20B and body member 30, the depth of first cavity portion 56 and the second cavity portion 58 (as determined by wall 70) prevents edible treats 20A/20B from being inserted too far into each cavity portion 56, 58. When edible treats 20A/20B are properly inserted into cavity portions 56/58, respectively, contact with bottom wall 70 ensures that a proper mating connection will be formed, particularly as such limits the distance of insertion for each edible treat 20A/20B to a proper depth.

In addition to the foregoing, in the event an animal may break the edible treat 20A/20B, bottom wall 70 is to prevent the edible treat 20A/20B from falling within body member 30, and being held by the pet toy to ensure that the animal may obtain the edible treat 20A/20B.

Referring to FIGS. 10-15, there is shown another embodiment of pet toy product at reference character 200. Similar to the previous embodiments, the mating connection 50 formed between the edible treat 20 and the body member 30 may provide both a connection between the edible treat 20 and the body member 30 which engages to connect the edible treat 20 and the body member 30 and which disengages to separate the edible treat 20 from the body member 30. The mating connection 50 may be made to both engage and disengage by an elastic deformation of the body member 30.

Also similar to the prior embodiments, the mating connection 50 is a form locking connection which may be particularly arranged to inhibit the edible treat 20 from being separated from the body member 30 upon a tongue 36 being inserted in a groove 22.

However, in contrast to the prior embodiments, a tongue 36 is located on edible treat 20, while a groove 22 is located on body member 30. As shown, the tongue 36 may project outwardly on the edible treat 20 to widen an intermediate portion of the edible treat 20 in relation to adjacent shoulder portions of the edible treat 20. The tongue 36 may be continuous around the edible treat 20 to widen the edible treat 20, and may have a semi-circular cross-sectional shape. Also as shown, the groove 22 may be located on the body member 30. The groove 22 may be continuous around the body member 30 and have a semi-circular cross-sectional shape to correspond to the tongue 36.

In the foregoing manner, edible treat 20 may be assembled with body member 30 by first inserting one end section 26 into ring aperture 34 such that tongue 36 is inserted in groove 22. Thereafter, in order to fully assemble, suitable force may be applied to the remaining (uninserted) section 26 of edible treat 20 transverse to appropriate surface 46 or 48 such that tongue 36 moves towards groove 22 and such that a sidewall of the groove 22 may elastically deform against contact with tongue 36 until entering groove 22, at which time groove 22 and the remainder of body member 30 may elastically recover with the tongue 36 inserted in groove 22 completely around edible treat 20.

Edible treat 20 may be disassembled from body member 30 also by applying suitable force transverse to appropriate surface 46 or 48 such that tongue 36 moves away from groove 22 and such that groove 22 may elastically deform against contact with tongue 36 until groove 22 may separate from tongue 36, at which time the groove 22 may elastically recover with the tongue 36 separated from groove 22.

While a preferred embodiment of the present invention has been described, it should be understood that various changes, adaptations and modifications can be made therein without departing from the spirit of the invention and the scope of the appended claims. The scope of the invention should, therefore, be determined not with reference to the above description, but instead should be determined with reference to the appended claims along with their full scope of equivalents. Furthermore, it should be understood that the appended claims do not necessarily comprise the broadest scope of the invention which the Applicant is entitled to claim, or the only manner(s) in which the invention may be claimed, or that all recited features are necessary.

What is claimed is:

1. A pet toy product comprising:
   a first edible pet treat comprising a first peripheral surface, first opposing end sections, and first opposing longitudinal sides, wherein the first edible pet treat comprises a first groove extending continuously around the first peripheral surface and the first edible pet treat has a first longest linear dimension;
   a second edible treat comprising a second peripheral surface, second opposing end sections, and second opposing longitudinal sides, wherein the second edible pet treat further comprises a second groove extending continuously around the second peripheral surface and has a second longest linear dimension;
   a body member, the body member comprising opposing sides, a first cavity comprising a first interior sidewall and a second cavity comprising a second interior sidewall;
   wherein:
   the first interior sidewall comprises a first intermediate portion between two first end portions, wherein the first intermediate portion has a first width that is narrow relative to a width of the two first end portions such that the first cavity comprises a first opening with an hourglass or barbell shape, wherein a first tongue extends continuously around the first opening;
   the second interior sidewall comprises a second intermediate portion between two second end portions, wherein the second intermediate portion has a second width that is narrow relative to the width of the two second end portions such that the second cavity comprises a second opening with an hourglass or barbell shape, wherein a second tongue extends continuously around the second opening;
   an axis A extends through the first and second openings;
   the first peripheral surface is complementary in shape to the shape of the first opening, such that the first edible treat is receivable into the first opening with the first longest linear dimension transverse to the Axis A;
   the second peripheral surface is complementary in shape to the shape of the second opening, such that the second edible treat is receivable into the second opening with the second longest linear dimension transverse to an Axis X;
   the body member further comprises a continuous solid shared wall that completely separates the first cavity from the second cavity; and
   in an assembled state, the first edible treat is inserted into the first opening such that the first edible treat is connected to the body member within the first cavity by a first releasable form locking connection between the first groove and the first tongue, and the second edible treat is inserted into the second opening such that the second edible treat is connected to the body member within the second cavity by a second releasable form locking connection between the second groove and the second tongue.

2. The pet toy product of claim 1, wherein:
   the first tongue is located between the first opening and a first side of the shared wall; and
   the second tongue is located between the second opening and a second side of the shared wall.

3. The pet toy product of claim 1, wherein:
   the first form locking connection is configured to deform to engage and disengage the first edible treat; and
   the second form locking connection is configured to deform to engage and disengage the second edible treat.

4. The pet toy product of claim 3 wherein:
   the first interior sidewall extends defines the interior peripheral surface of the first cavity;
   the second interior sidewall defines the interior peripheral surface of the second cavity;
   the inward extension of the first tongue from the first interior sidewall narrows the first cavity; and
   the inward extension of the second tongue from the second sidewall narrows the second cavity.

5. The pet toy product of claim 3, wherein:
   the body member comprises a first shoulder adjacent the first tongue;
   the body member comprises a second shoulder adjacent the second tongue;
   the first shoulder is tapered inward towards the first cavity to facilitate insertion of the first edible treat into the first cavity; and the second shoulder is tapered inward towards the first cavity to facilitate insertion of the second edible treat into the second cavity.

6. The pet toy product of claim 1, wherein in the assembled state, the body member, first edible treat, and second edible treat form a disc shape.

7. The pet toy product of claim 1, wherein the body member is in the form of an oblong ring.

8. The pet toy product of claim 1, wherein the first and second edible treats each comprise an edible resin comprising starch.

9. The pet toy product of claim 1, wherein the first tongue has a semi-circular cross sectional shape and the second tongue has a semi-circular cross sectional shape.

10. The pet toy product of claim 1, wherein the body member provides a continuous band of pliable polymer material around a peripheral surface of the first edible treat and a peripheral surface of the second edible treat.

* * * * *